United States Patent [19]

Mielnik

[11] Patent Number: 5,030,163
[45] Date of Patent: Jul. 9, 1991

[54] PROCESS AND DEVICE FOR FILLETING OF MEAT

[75] Inventor: Jan Mielnik, Maltrostveien, Norway

[73] Assignee: MATFORSK, Norsk Institutt for Naeringsmiddelforskning, Osloveien, Norway

[21] Appl. No.: 246,303

[22] PCT Filed: Dec. 11, 1987

[86] PCT No.: PCT/NO87/00079

§ 371 Date: Sep. 6, 1988

§ 102(e) Date: Sep. 6, 1988

[87] PCT Pub. No.: WO88/04894

PCT Pub. Date: Jul. 14, 1988

[30] Foreign Application Priority Data

Jan. 7, 1987 [NO] Norway .................................. 870070

[51] Int. Cl.⁵ ........................ A22C 25/16; A22C 21/00
[52] U.S. Cl. ....................................... 452/136; 452/125
[58] Field of Search ..................... 17/46, 1 G, 11, 21, 17/52, 56; 452/136, 135, 125

[56] References Cited

U.S. PATENT DOCUMENTS

| | | | |
|---|---|---|---|
| 4,216,565 | 8/1980 | Volk et al. | 17/1 G |
| 4,299,009 | 11/1981 | Tournier | 17/1 G |
| 4,327,463 | 5/1982 | Martin | 17/1 G |
| 4,380,849 | 4/1983 | Adkinson et al. | 17/11 |
| 4,446,600 | 5/1984 | Hooley et al. | 17/11 |
| 4,488,332 | 12/1984 | Atteck et al. | 17/46 |
| 4,495,675 | 1/1985 | Hill et al. | 17/1 G |
| 4,811,456 | 3/1989 | Heuvel | 17/1 G |

OTHER PUBLICATIONS

"Protecon Automatic Deboning Systems for Poultry (P.A.D.)", of Stork Protecon.
"The New Way to Cut Up and Debone Turkey...", of Barker/Food Craft.
Abstract of International Appln. No. PCT/AU84/00246, International Publication No. WO85/02320 for Method and Apparatus for Stripping Meat from Bones.

Primary Examiner—Willis Little
Attorney, Agent, or Firm—Poms, Smith, Lande & Rose

[57] ABSTRACT

A method and apparatus for filleting meat from bone containing meat material wherein at least one of the knuckles of the piece of bone which passes through the meat material, is removed before the meat is stripped from the bone. Alternatively, the meat piece is cut approximately in half, resulting in two meat pieces, each including a straight or central bone section surrounded by meat with only one knuckle. Thereafter, the knuckle of the meat piece is placed into a slot of a holder and clamped by means of a piston. The apparatus includes a knife assembly on a frame movably mounted relative to the clamp, with the frame carrying first and second pairs of coacting knife members configured and positioned for defining a meat stripping opening. The meat piece is clamped with the straight or central section of bone aligned for placement within the meat stripping opening with the knife members of the knife assembly initially in proximity to the knuckle. Then, the knife members are moved into contact with the meat piece, and the knife assembly frame is moved in the direction of orientation of the straight or central section of bone to thereby strip the meat from the bone. Alternative holder devices are provided.

8 Claims, 3 Drawing Sheets

PROCESS AND DEVICE FOR FILLETING OF MEAT

BACKGROUND OF THE INVENTION

The present invention concerns a process for filleting meat material containing bones, especially from poultry, livestock, and pigs, as well as a device to carry out the process and where the filleted meat is kept mainly intact.

Previously known are machine-using methods for filleting of meat from bone-containing material. Such devices, however, suffer from several weaknesses both in construction and embodiments.

The general problem with filleting of bone containing meat material where the bone consists of a central bone which runs through the piece of meat, for instance a thigh-bone from chicken, lies in the shape of the bone. Generally, the bone consists of a more or less straight central bone secton with an expanded bone part, such as a knuckle on each end. These knuckles form an obstacle by mechanical pressing off of the meat from the bone, both as they are physically working as a stopper for the meat during the pressing off and in addition because knives which are used by the mechanical filleting have a tendency to dull when they cut into the bone material.

It is thus known within the art a machine from Protecon systems (Protecon Automatic Deboning Systems for Poultry, P.A.D.) for automatical filleting of thigh bones and wings from poultry. This system comprises i.a. a transport band with upwards extending pins for introduction of the meat pieces in the filleting machine. However, such an embodiment of the transport band will, when used, cause the meat material to stick between the pins and the transport band and prevent further operation of the machine before it has been cleaned. This will lead to a stop in the operation and wasted working time. A further drawback of such a machine is that possible broken bones in the material are not considered. In industrially handled material, there may be as much as up to 30-40% broken bones and this causes that the finished filleted material from the filleting machine may contain unacceptably large amounts of bone material.

Also the forms of the transport band represents a drawback by the mentioned type of machine. These forms have no possibility for regulation, so that small meat pieces will have a poor fastening and may thus be led the wrong way into the machine, while large meat pieces will lead to the previously mentioned clogging of the form pins on the transport band with the disadvantages this leads to.

Another known type of filleting machine is sold by Barker/FoodCraft and uses rotating knives for the removal of the meat from the bone of meat material. This machine does not consider bones broken before treatment of the piece of meat for filleting either, even if the distributor maintains that breaks caused by the use of the machine are reduced. One disadvantage of this type of machine is that the meat has a tendency to be ground into minced meat by the rotating knives, so that the production of whole fillets of meat is difficult to achieve.

A third type of filleting machine is known from European Patent Application No. PCT/AU84/00246 with international publication No. WO 85/02320. This type of filleting device however, utilizes a different principle from that of the present invention, since this known device uses water with high pressure to remove the meat from the bone of the treated meat pieces. Such an embodiment has, however, the disadvantages that the meat easily may become insipid and that the piece of bone must be fastened very firmly since the piece of meat rotates at high speed during the filleting process to remove the loosened meat by help of the centrifugal force, and will thus comprise a cumbersome process for this type of filleting.

SUMMARY OF THE INVENTION

The present invention has the intention to produce a process for filleting meat from bone containing meat material where the whole meat fillets are kept mainly without being destroyed, where the degree of utilization of the meat pieces is large and which is simple to perform. The distinguishing features by such an embodiment is that one of the knuckles of the central piece of bone which passes through the meat material, is removed before the meat is pressed off the bone by help of a knife device which will be described later.

In accordance with the invention, at least one of the knuckles of the piece of bone which passes through the meat material, is removed before the meat is stripped from the bone. Alternatively, for larger pieces, the preprocessed bone and meat is cut approximately in half, resulting in two pre-processed meat pieces, each including a straight or central bone section surrounded by meat with only one knuckle. Thereafter, the knuckle of the meat piece is placed into a slot of a knuckle receiving holder and clamped by means of a piston. The apparatus includes a knife assembly which includes a frame movably mounted relative to the clamps, with the frame carrying first and second pairs of coacting knife members configured and positioned for defining a meat stripping opening. The meat piece is clamped with the straight or central section of bone aligned for placement within the meat stripping opening with the knife members of the knife assembly initially in proximity to the knuckle. Then, the knife members are moved into contact with the meat piece, and the knife assembly frame is moved in the direction of orientation of the straight or central section of bone to thereby strip the meat from the bone. Alternative holder devices are provided.

Other objects, features and advantages of the invention will become readily apparent from a reading of the specification, when taken in conjunction with the drawings, in which like reference numerals refer to like elements in the several views.

DESCRIPTION OF THE PREFERRED EMBODIMENT

Figure 1:
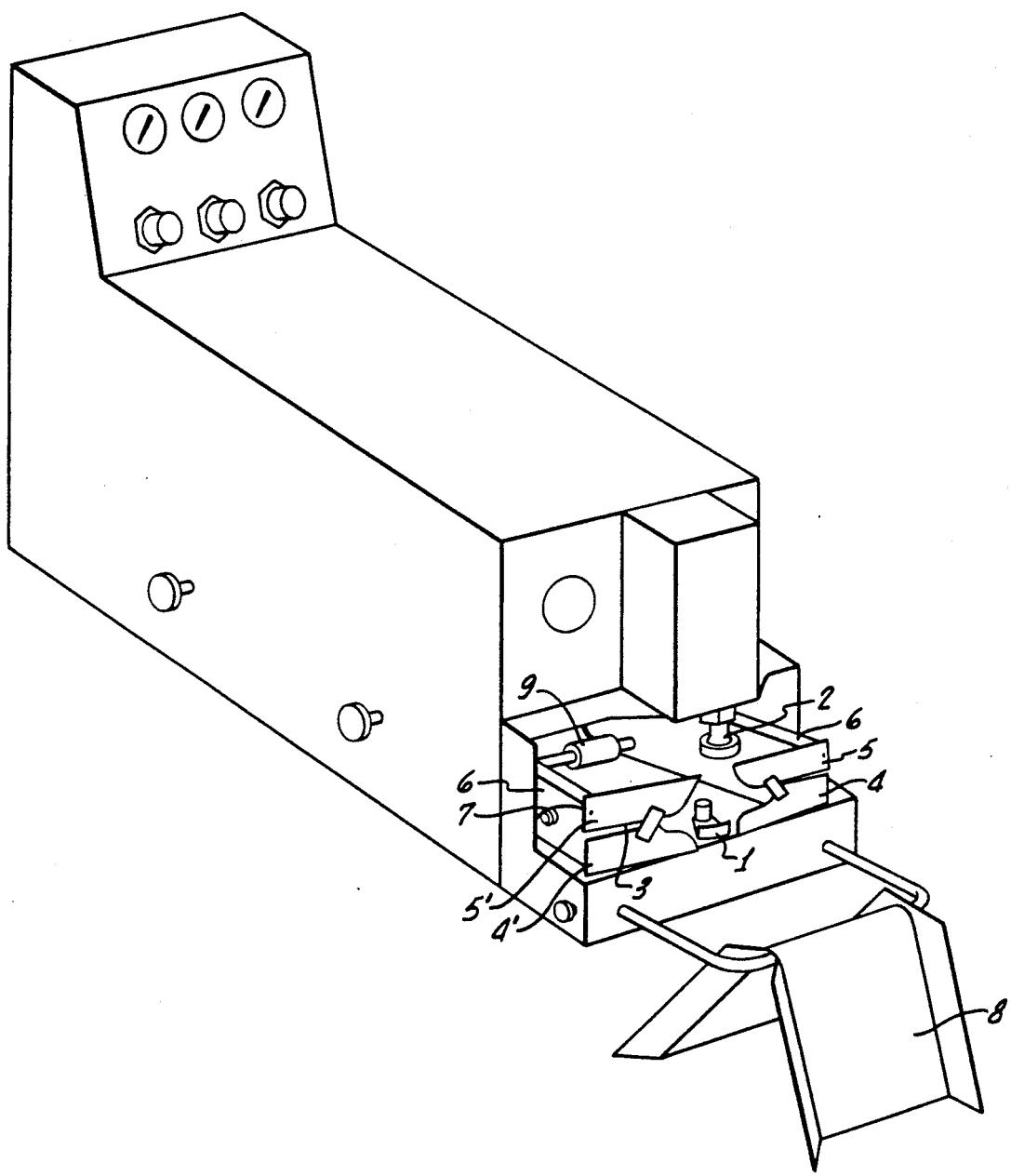
FIG. 1 is a perspective view of the meat filleting apparatus according to the invention.

By using the device according to the invention shown in FIG. 1, it is necessary to use pieces of meat where there is only one knuckle. Such pieces of meat may be produced either by previously removing one of the knuckles of the piece of meat or by dividing a piece of meat with bone into two, so that each part retains one knuckle.

Figure 4A:
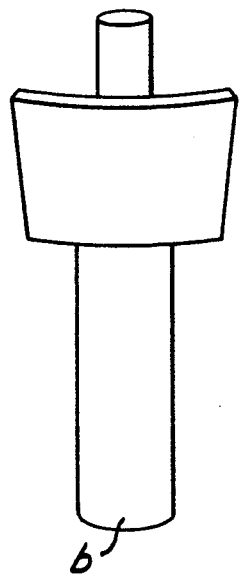
FIGS. 4a and 4b depict front and side elevational views of a first embodiment of a holder for use in the apparatus of FIG. 1.
Figure 4B:
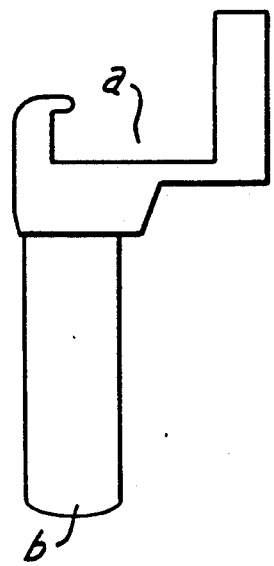

By removal of the meat from the bone in the treated piece of meat, the knuckle is placed in the slot (a) in the holder (1). As shown in FIG. 4, the holder (1) includes a shaft portion "b" which is placed in a bore (not shown) in the table of the apparatus. The recess or slot "a" is defined by first and second upright portions, one of which is higher than the other, for orienting the straight or central section of the bone to the left as viewed in FIG. 4b which will be to the front of the apparatus as viewed in FIGS. 1 and 2.

The rest of the disclosed treatment steps are automatical and preferably pneumatically or hydraulicly controlled.

To secure the piece of meat, a securing device on the figure shown as a piston (2) which is pneumatically or hydraulicly controlled, thereafter presses the knuckle securely in the groove (a) in the holder (1).

The next step in the filleting process is to press together two knife assemblies which are pneumtically or hydraulicly controlled, and the knife assembly is then pressed forwards in a direction out from the machine. Thereby the meat will be removed from the bone and the mainly intact fillets will fall down on a separating chute (8), while the meat-free knuckle will fall down on the other side of the separating shoot when the piston (2) again moves upwards to release the knuckle and to receive another piece of meat.

The described knife assembly (3) comprises the shown embodiment of four knives placed in pairs (4,4', 5,5'), whereof the undermost pair of knives (4,4') is mounted on the pneumatically or hydraulicly controlled arms (6), while the uppermost pair of knifes (5,5') is rotatably mounted relative to the lower pair of knives (4,4') and loaded by help of springs (7), so that the knives adapt themselves automatically to the shape and size of the bone type which is to be filleted. In addition, the shape of the knives is such that they between themselves in a pressed together condition form an opening (10) wherein there is room for the bone (shown in FIG. 3).

After the piece of meat has been fastened in the holder (1) by the piston (2), the arms (6) are pressed together for the knives (4,4', 5,5') to cut tendons and meat in the area around the secured knuckle. The pressure of the arms (6) may be regulated, for instance by a piston (9) which is mounted between the two arms (6).

After the knives have been pressed together, the arms (6) are moved forwards relatively to the fastening device (2) and the holder (1), so that the meat is pressed from the bone.

In detail, the operation is as follows. After clamping of the knuckle of the piece of meat, the components of the apparatus are in the positions depicted in FIGS. 1 and 2. The clamping area is at the forward end of the enclosure of the apparatus, which includes a vertically (as oriented in the drawings) movable piston (2) which coacts with holder (1) to restrain or clamp the knuckle of the meat piece to be processed. Within this area, there is located a knife assembly (3), which includes first and second pairs of knife members, designated (4,4') and (5,5'), which knife members are mounted on a pair of side arms (6), which form a frame movable from the position shown in FIG. 2 to the position shown in FIG. 3. The lower and upper knife members (4, 4'), and (5, 5'), respectively, are blade-shaped members oriented for actuation toward one another in a contacting slightly overlapping relation. The arms (6), are pneumatically or hydraulically controlled, and, as will be described, move in two directions. In one movement, the arms (6) move toward one another under force of a piston (9), and in another movement, they move together in a generally horizontal direction, which direction coincides with the orientation of the central section of bone of the meat piece to be processed as will be described.

Figure 2:
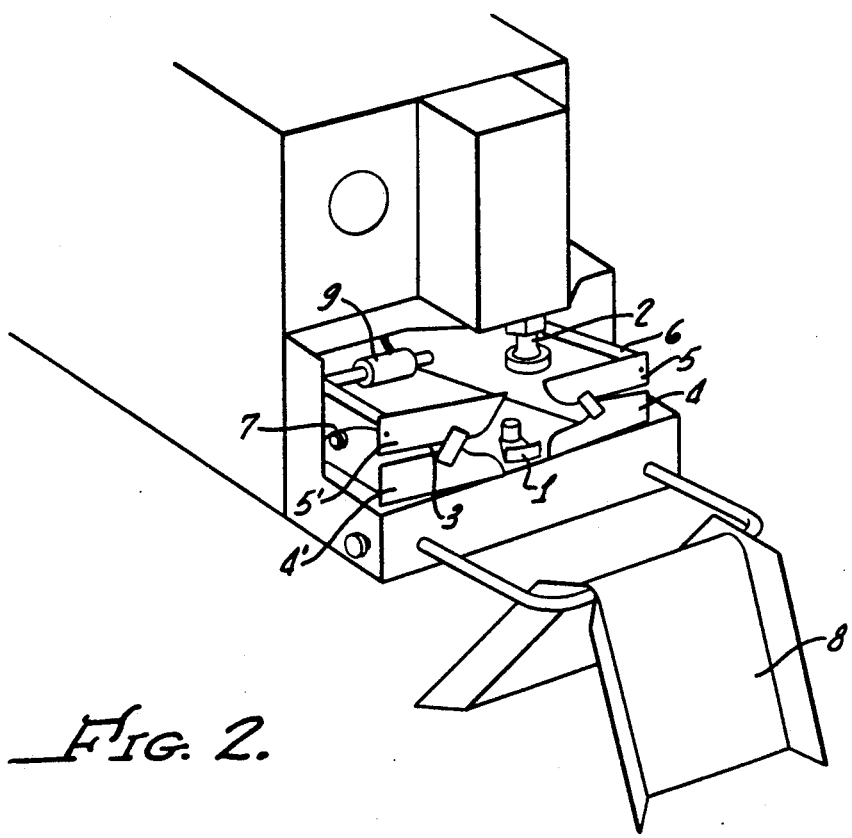
FIG. 2 is a partial perspective view of the knife assembly in the device from FIG. 1 with the frame retracted and the knife members withdrawn.

In the initial position, with the meat piece clamped at the knuckle of the bone, the arms (6) of the frame are retracted to the position shown in FIGS. 1 and 2. The four knives of the knife assembly (3) are initially out of engagement with the meat piece. Each of the lowermost pair of knives (4, 4') is fixedly secured to a free end of one of the arms (6), while each of the uppermost pair of knives (5, 5') is pivotable relative to the lower knives (4, 4') and rotatably loaded by help of springs (7), so that the knives adapt themselves automatically to the shape and size of the bone type which is to be filleted. In addition, the shape of the knives is such that they, between themselves, in the operative pressed together condition (See FIG. 3) form an opening (10) which approximates the cross-section of the central section of bone. With the spring loaded upper knives (5, 5') irregularities in contour of the bone are accommodated during scraping or removal of the meat therefrom.

After the piece of meat has been fastened in the holder (1) by the piston (2), the next step in the filleting process is to actuate movement of the two arms (6) toward one another, via the piston (9), during which movement, the spaced coacting pairs of knives (4, 4') and (5, 5') traverse a first line toward the meat piece to cut the tendons, ligaments and meat in the area adjacent the secured knuckle, and stop at the central bone section. The pressure of the arms (6) may be regulated by regulation of the force of piston (9) which is mounted between the two arms (6).

Figure 3:
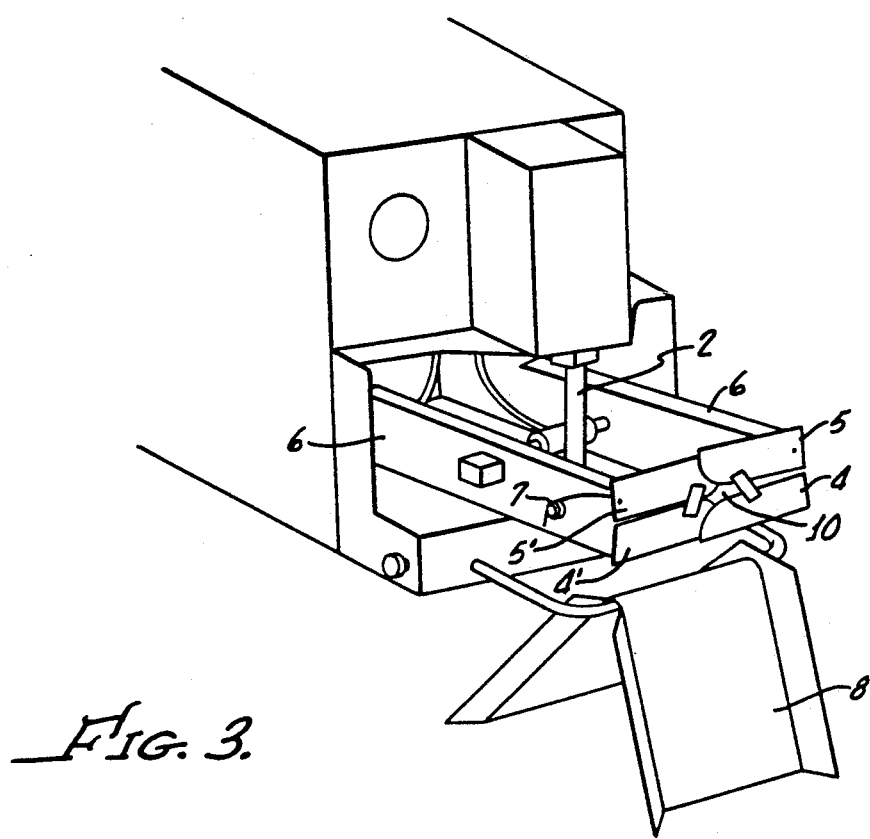
FIG. 3 is a partial perspective view similar to FIG. 2 with the frame of the knife assembly extended to an extreme position and the knife members moved to a position for stripping the meat from the bone.

Thereafter, under pneumatic or hydraulic control, the two arms (6) along with the two pairs of knife members (4, 4') and (5, 5') are extended, or moved, as a unit, forwards relative to the holder (1), along a second line in a direction out from the machine to the position shown in FIG. 3. During this forward movement, the arcuate configuration of the forward engaging edges of the knives (4, 4', 5, 5') are in scraping contact with the bone. Thereby the meat will be removed from the central bone section and the mainly intact fillets will fall down on a separating chute (8), while the meat-free knuckle will fall down on the other side of the separating chute (8) when the piston (2) again moves upwards to release the knuckle and to receive another piece of meat.

Figure 5A:
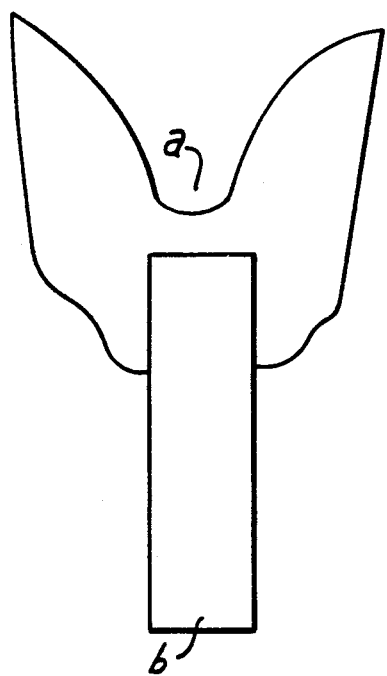
FIGS. 5a and 5b depict front and side elevational views of another embodiment of a holder for use in the apparatus of FIG. 1, the holder being shaped as a knife assembly.
Figure 5B:
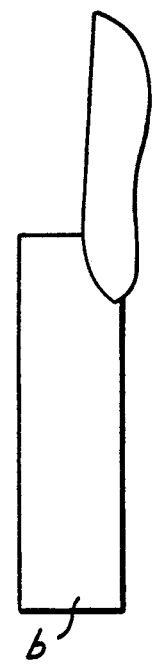

In an alternate embodiment the holder (1) may in itself comprise an approximately V-format knife. By placing the knuckle in such a holder a large part of tendons and ligaments near the knuckle will be cut when the piston (2) presses the knuckle to secure it in the V-formed knife (see FIG. 5). With the holder of FIG. 5 providing knife edges in the vertical direction, and the coacting knife members providing cutting edges in a more generally horizontal direction, the combined cutting effect is to sever virtually all tendons and ligaments at the knuckle prior to stripping the meat from the bone.

The holder (1) may in addition comprise grooves (b) for the correct positioning in the device according to the invention.

The device and process according to the invention may also be used for meat which has been pre-treated to loosen the bone from the meat, for instance by ultrasound treatment or by treatment with ligament attacking enzymes etc.

By using the process and device which has been described according to the present invention, the loss of meat material by filleting will be reduced considerably, compared to previous techniques, and at the same time meat splints will to a larger extent than previously be avoided in the filleted meat material. The present invention at the same time makes it possible to achieve better meat qualities, because the meat fillets after treatment in a device according to the invention will be present mainly as undamaged meat. In addition, it will be of advantage that meat pieces with breaking damages in the central bone to a larger extent that previously may be used, whereby such pieces of meat according to the present invention may be cut into two pieces in the fracture before the filleting process begins. Thus, fractured bones will be of no consequence, and at the same time the extent of use of the pieces of meal will be significantly improved.

I claim:

1. Device for the removal of meat from the central bone of meat pieces where the device comprises organs for securing the bone knuckle as well as knife assemblies for removing the meat from the bone of the piece of meat, characterized in that the securing device comprises a holder (1) with a pressing organ such as a piston (2) which co-operates with the holder (1) to secure one bone knuckle of the piece of meat, a knife assembly (3) for scraping away meat fillets from the central bone of the piece of meat, and a frame movable relatively to the fastening device (6), the knife assembly being mounting on said frame;

said knife assembly comprising at least four separate scraping knives (4, 4', 5, 5'), the separate scraping knives comprising at least two pairs of knives, where at least one pair of knives (4, 4') is securely mounted to the movable frame (6), while at least the other pair of knives (5, 5') is rotatably hinged and spring powered (7) for adaption to the central bone of the piece of meat.

2. Device according to claim 1, characterized in that the pair of knives (4, 4', 5, 5') between themselves comprise a space approximately adapted to the central bone of the piece of meat.

3. Device according to claim 1, characterized in that the holder (1) comprises an approximately V-formed knife assembly to receive the central bone of the piece of meat.

4. Device according to claim 3, characterized in that the holder may be exchanged.

5. Apparatus for the removal of meat from the bone of meat pieces, such as chicken and other livestock, where the meat piece includes a bone having knuckles at opposite ends of a central bone section, and wherein one knuckle has been removed to provide an obstructed path for removal of the meat, said apparatus comprising:

means for securing the meat piece by the remaining knuckle;

knife means;

means for moving said knife means along a first line into meat and tendon severing engagement with the central bone section adjacent the remaining knuckle;

means for moving said knife means along a second line away from the remaining knuckle and along the path of the central bone section with said knife means in contact therewith for scraping away fillets from the central bone section, whereby fillets are achieved wherein the meat is present mainly as undamaged meat;

said knife means including first and second spaced generally parallel arms each having at least one scraping knife secured to the free end thereof, and wherein said means for moving said knife means along a first line includes means for varying the spacing between said arms for moving the scraping knives thereon into coacting engagement with the piece of meat;

said means for moving said knife means along a second line including means for moving said first and second arms simultaneously in a direction along the path of the central bone section of the piece of meat;

said knife means including at least one other pair of scraping knives pivotably mounted relative to said first pair of scraping knives, said scraping knives being dimensioned, configured and arranged for forming a space approximately adapted to the central bone section of the piece of meat with said knife means moved along said first line into coacting engagement with the meat piece.

6. Apparatus for the removal of meat from the bone of meat pieces, such as chicken and other livestock, where the meat piece includes a bone having knuckles at opposite ends of a central bone section, and wherein one knuckle has been removed to provide an unobstructed path for removal of the meat, said apparatus comprising:

holder means for receiving the meat piece therein adjacent the remaining knuckle;

clamp means for securing the meat piece in said holder means with the central bone section in a given orientation;

first and second arm means spaced in generally parallel relation with said holder means therebetween;

knife means secured in operative relation with each of said arm means;

means for varying the spacing between said arm means for moving said knife means along a first line into meat and tendon severing engagement with the central bone section adjacent the remaining knuckle; and means for moving said first and second arm means simultaneously for moving said knife means along a second line away from the remaining knuckle and along the path of the central bone section with said knife means in contact therewith for scraping away fillets from the central bone section, whereby fillets are achieved wherein the meat is present mainly as undamaged meat;

said knife means including a first pair of first and second knife members secured to the free end of said first and second arm means, respectively, with said first and second knife members oriented for coacting relation with one another and with the meat piece with said arm means moved toward one another along said first line, said knife means including a second pair of first and second knife members, said first knife member of said second pair being rotatably hinged and spring biased relative to the first knife member of said first pair of knife members, with said second knife member of said second pair being rotatably hinged and spring biased relative to the second knife member of said first pair of knife members, all of said knife members being configured for adaptation to the central bone section of the piece of meat with said arm means moved toward one another along said first line.

7. The apparatus according to claim 6 wherein, with said arm means moved toward one another along said first line, said knife means define a space approximately adapted to the cross-sectional contour of the central bone section of the piece of meat.

8. The apparatus according to claim 6 wherein said holder means includes an approximately V-formed knife assembly configured for receiving the central bone section of the piece of meat adjacent the junction of the central bone section with the remaining knuckle.

* * * * *